Sept. 15, 1925.
J. B. COLLINS
VEHICLE BUMPER
Filed Jan. 3, 1925
1,554,069
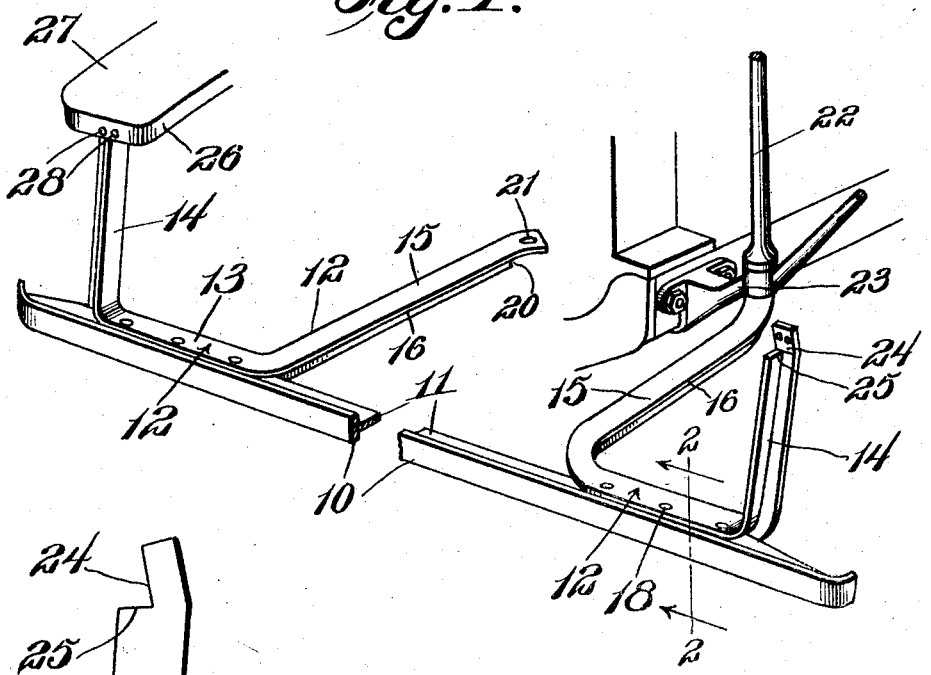
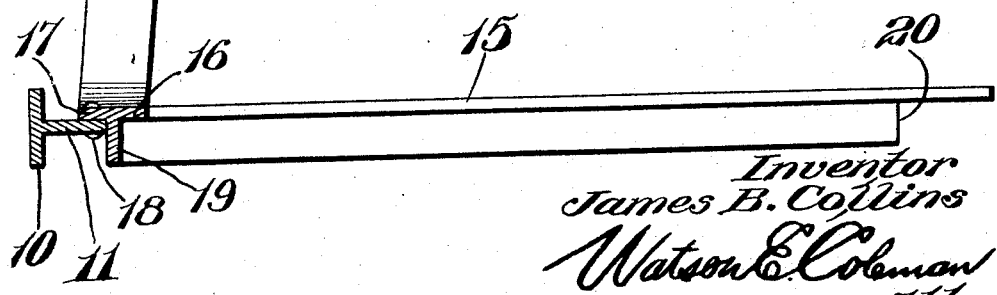
Inventor
James B. Collins
Watson E. Coleman
Atty Patented Sept. 15, 1925.

1,554,069

UNITED STATES PATENT OFFICE.

JAMES B. COLLINS, OF TULSA, OKLAHOMA.

VEHICLE BUMPER.

Application filed January 3, 1925. Serial No. 383.

*To all whom it may concern:*

Be in known that I, JAMES B. COLLINS, a citizen of the United States, residing at Tulsa, in the county of Tulsa and State of Oklahoma, have invented certain new and useful Improvements in Vehicle Bumpers, of which the following is a specification, reference being had to the accompanying drawings.

This invention relates to vehicle bumpers and more particularly to a bumper for attachment to automobiles.

An important object of the invention is to provide a device of this character which has the necessary strength and which, at the same time, has not too great a weight and may be very cheaply produced.

A still further object of the invention is to provide means for reinforcing the forward ends of the front fenders of automobiles from the bumper element. As is well known to those familiar with the art, a backing vehicle often has a portion such as a spring rear fender, tire carrier or the like which will project over the bumper and come into contact with the vehicle to which the bumper is attached before the bumper engages to check movement. This often results in crushing and disfiguring of the front fenders of the vehicle, particularly the types thereof which are not supported in any way.

A further object of the invention is to provide a device of this character which may be readily attached and which has employed in its construction a minimum number of parts all formed from the same type of material.

These and other objects I attain by the construction shown in the accompanying drawings, wherein for the purpose of illustration is shown a preferred embodiment of my invention and wherein:—

Figure 1 is a perspective view showing a bumper constructed in accordance with my invention attached to the body and fender of a vehicle;

Figure 2 is a section on the line 2—2 of Figure 1.

Referring now more particularly to the drawings, the front or bumper bar proper consists of a flat front flange 10 and a horizontally directed flange 11. In the present instance, the material employed in the construction of the front bar is T-iron, the head of which forms the vertical flange 10 and the stem of which forms the horizontal flange 11. L-iron could be employed at this point with equal facility if so desired. T-iron is, however, preferred for the reason that the strengthening flange thereof is disposed at the center and accordingly the bar is more rigid throughout its surface. This bar will extend entirely across the front of the vehicle in the usual manner.

Attaching sections 12 are provided, each formed from T-iron and including a bight portion 13 having a vertical arm 14 at one end thereof and a horizontal arm 15 at the opposite end thereof. In referring to these arms as vertical and horizontal it will, of course, be understood that their approximate positions are indicated. At the bight portion, the head flange 16 of the T-iron is horizontally disposed and has one arm 17 thereof resting upon the inner edge of the horizontally disposed stem portion 11 of the front bar and secured thereto by rivets 18. The stem 19 depends and abuts against the inner edge or base of the stem 11. That end of the bight portion disposed inwardly, as regards the outer end of the bar, is provided with a horizontal arm 15 and in this arm, the stem 19 and head 16 are vertical and horizontal respectively, as in the bight portion. Adjacent the rear end of the horizontal arm, the stem portion is cut away, as at 20 and the extended portion of the head is formed with an opening 21 permitting passage therethrough of the bolt ordinarily employed for fastening the headlight stem 22 to its bracket 23. The arms 15 preferably converge rearwardly and as the brackets 23 are rigidly secured to the vehicle frame, will hold the front bar very firmly in position and provide a structure which is very rigid to the vehicle frame.

The vertically extending arms 14 have their stem portions directed transversely of the vehicle and facing outwardly so that these vertically extending portions may be formed by merely bending the T-iron upwardly at the outer end of the bight portion. The head section which is directed longitudinally of the vehicle of this arm, is cut away at the front side of the stem at the upper end of the arm, as indicated at 24 and this portion of the arm is inclined forwardly. The cutting away of the head at one side of the stem provides an upwardly facing shoulder 25 and a flat front surface for the arm. This flat front surface is adapted to abut against the rear face of the vertically extending flange 26 of the fender 27 to the brace 22 of which the corresponding horizontally extending arm 15 is attached and is secured to the vertically extending flange 26 by rivets or the like, as indicated at 28. It will be noted that a rigid vertically extending arm is thus provided, the upper end of which is rigidly secured to the fender to brace the same from shock which may be applied thereto. This arm will further serve to prevent the entry of anything beneath the fender in event of collision.

It will be obvious that the general structure hereinbefore set forth must necessarily be modified in certain particulars to permit its attachment to various types of cars and I accordingly do not limit myself to such specific structure except as hereinafter claimed.

I claim:—

1. A bumper comprising a front bar adapted to extend transversely of a vehicle and having a rearwardly directed flange and a combined brace and attaching arm engaged with said flange adjacent each end of the bumper including a bight portion seated upon and secured to said flange, a rearwardly directed arm adapted for engagement with the body of the vehicle and a vertically directed arm for engagement with the fender of the vehicle.

2. A bumper comprising a front bar adapted to extend transversely of a vehicle and having a rearwardly directed flange and a combined brace and attaching arm engaged with said flange adjacent each end of the bumper including a bight portion seated upon and secured to said flange, a rearwardly directed arm adapted for engagement with the body of the vehicle, a vertically directed arm for engagement with the fender of the vehicle, said combined braces and attaching arms being each formed from a single length of T-iron bent to provide a bight portion at opposite ends of which rearwardly and vertically directed arms are formed respectively, the bight portion having the head flange thereof attached to the rearwardly directed flange of the front bar, one side of the head flange at the upper end of the upwardly directed arm being cut away flush with the surface of the stem to thereby provide a flat face for engagement with the depending flange of the fender.

3. A bumper comprising a front bar adapted to extend transversely of a vehicle and having a rearwardly directed flange and a combined brace and attaching arm engaged with said flange adjacent each end of the bumper including a bight portion seated upon and secured to said flange, a rearwardly directed arm adapted for engagement with the body of the vehicle, a vertically directed arm for engagement with the fender of the vehicle, said combined braces and attaching arms being each formed from a single length of T-iron bent to provide a bight portion at opposite ends of which rearwardly and vertically directed arms are formed respectively, the bight portion having the head flange thereof attached to the rearwardly directed flange of the front bar, one side of the head flange at the upper end of the upwardly directed arm being cut away flush with the surface of the stem to thereby provide a flat face for engagement with the depending flange of the fender, the rearwardly directed arm having the stem portion thereof vertically disposed, the stem portion being cut away adjacent the rear end of the arm, the rear end of the arm having an opening formed in the head flange for the reception of a securing element.

4. A bumper for vehicles having fenders, and braces for the fenders extending outwardly from and rigidly secured to the frame, the fenders having depending flanges, comprising a bar adapted to extend transversely of the vehicle at the forward end thereof and having a member secured to each end of the bar, each member comprising a bight portion having at its inner end a rearwardly directed arm engaging the fender brace adjacent the vehicle frame and at its outer end an upwardly directed arm rigidly secured to the depending flange of the fender, the bight portion being rigidly secured to the bar.

5. A bumper comprising a front bar adapted to extend transversely of a vehicle and having a rearwardly directed flange and a combined brace and attaching arm engaged with said flange adjacent each end of the bumper including a bight portion seated upon and secured to said flange, a rearwardly directed arm adapted for engagement with the body of the vehicle, a vertically directed arm for engagement with the fender of the vehicle, said combined braces and attaching arms being each formed from a single length of T-iron bent to provide a bight portion at opposite ends of which rearwardly and vertically directed arms are formed respectively, the bight portion having the head flange thereof attached to the rearwardly directed flange of the front bar, one side of the head flange at the upper end of the upwardly directed arm being cut away flush with the surface of the stem to thereby provide a flat face for engagement with the depending flange of the fender, the stem flange of the bight portion abutting against the rear edge of the rearwardly directed flange of the bar.

In testimony whereof I hereunto affix my signature.

JAMES B. COLLINS.